(12) United States Patent
Wyss et al.

(10) Patent No.: US 11,468,897 B2
(45) Date of Patent: Oct. 11, 2022

(54) SYSTEMS AND METHODS RELATED TO AUTOMATED TRANSCRIPTION OF VOICE COMMUNICATIONS

(71) Applicant: Genesys Telecommunications Laboratories, Inc., Daly City, CA (US)

(72) Inventors: Felix Immanuel Wyss, Indianapolis, IN (US); Conor P. McGann, San Carlos, CA (US)

(*) Notice: Subject to any disclaimer, the term of this patent is extended or adjusted under 35 U.S.C. 154(b) by 289 days.

(21) Appl. No.: 16/910,717

(22) Filed: Jun. 24, 2020

(65) Prior Publication Data

US 2021/0407511 A1    Dec. 30, 2021

(51) Int. Cl.
  *G10L 15/00*    (2013.01)
  *G10L 15/26*    (2006.01)
  *H04M 3/51*    (2006.01)
  *G10L 15/08*    (2006.01)

(52) U.S. Cl.
  CPC .............. *G10L 15/26* (2013.01); *G10L 15/08* (2013.01); *H04M 3/51* (2013.01); *G10L 2015/088* (2013.01); *H04M 2201/40* (2013.01); *H04M 2203/6009* (2013.01)

(58) Field of Classification Search
  CPC ......... G10L 15/26; G10L 15/22; G10L 15/08; G10L 15/10; G10L 2015/088; H04M 3/51; H04M 3/436; H04M 3/5183; H04M 2203/6009; H04M 2201/40
  See application file for complete search history.

(56) References Cited

U.S. PATENT DOCUMENTS

| | | | |
|---|---|---|---|
| 8,209,171 B2 | 6/2012 | Abbott et al. | |
| 10,110,741 B1* | 10/2018 | Cohen | .................. H04M 3/436 |
| 10,373,612 B2 | 8/2019 | Parthasarathi et al. | |
| 11,200,892 B1* | 12/2021 | Stoops | .................... G10L 15/22 |

* cited by examiner

*Primary Examiner* — Md S Elahee (57) ABSTRACT

A method for selectively transcribing voice communications that includes: receiving keywords; receiving an audio stream of audio data of speech; searching the audio stream to detect keywords or keyword detections and recording parameter data for each that includes a location of the keyword within the audio stream; generating one or more cumulative datasets for one or more portions of the audio stream that each includes parameter data for the keyword detections occurring therein; for each of the one or more portions of the audio stream, calculating a transcription favorableness score via inputting the corresponding one of the one or more cumulative datasets into an algorithm; and determining whether to transcribe each of the one or more portions of the audio stream by comparing the corresponding transcription favorableness score against a predetermined threshold.

24 Claims, 3 Drawing Sheets

SYSTEMS AND METHODS RELATED TO AUTOMATED TRANSCRIPTION OF VOICE COMMUNICATIONS

BACKGROUND

The present invention generally relates to telecommunications systems in the field of customer relations management including customer assistance via internet-based service options and voice communications. More particularly, but not by way of limitation, the present invention pertains to systems and methods for facilitating the transcription of voice communications using speech processing including keyword spotting and automatic speech recognition.

BRIEF DESCRIPTION OF THE INVENTION

The present invention may include a method for selectively transcribing voice communications. The method may include the steps of: receiving key phrases or words (hereinafter "keywords"); receiving an audio stream that includes audio data of speech; searching the audio stream to detect instances of spoken keywords (hereinafter "keyword detections") and recording parameter data for each of the keyword detections, the parameter data including at least a location of the keyword detection within the audio stream; generating one or more cumulative datasets for one or more portions of the audio stream, each of the one or more cumulative datasets including the parameter data for the keyword detections occurring within a corresponding one of the one or more portions of the audio stream; for each of the one or more portions of the audio stream, calculating a transcription favorableness score via inputting the corresponding one of the one or more cumulative datasets into an algorithm; and determining whether to transcribe each of the one or more portions of the audio stream by comparing the corresponding transcription favorableness score against a predetermined threshold.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product having computer-usable program code embodied in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Figure 1:
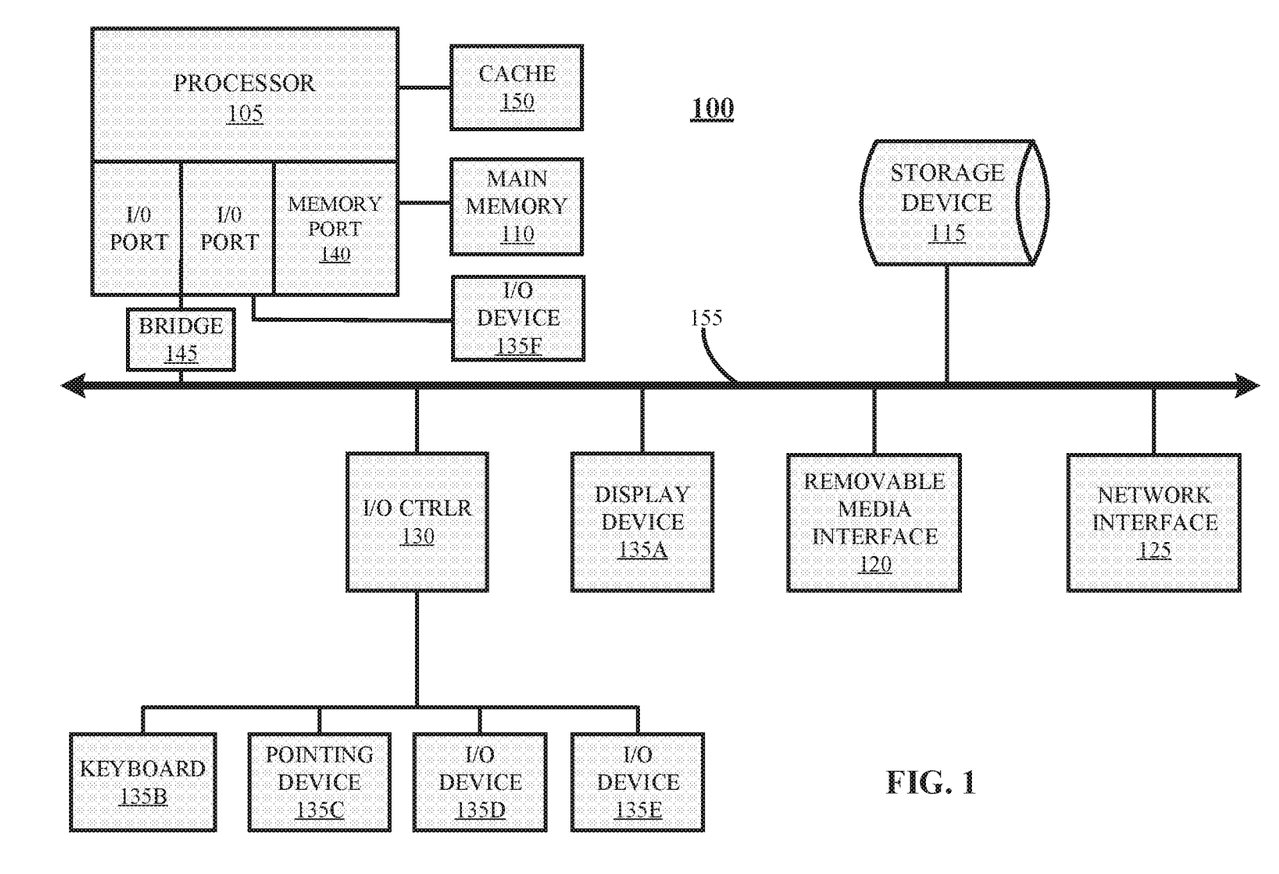
FIG. 1 depicts a schematic block diagram of a computing device in accordance with exemplary embodiments of the present invention and/or with which exemplary embodiments of the present invention may be enabled or practiced.

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein, the various servers and computer devices thereof may be located on local computing devices or remote computing devices (i.e., off-site or in a cloud-based or cloud computing environment, for example, in a remote data center connected via a network), or some combination thereof.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include, a display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system and software that run on the computing device 100. The operating system may control scheduling tasks and access to system resources.

As depicted in the illustrated example, the computing device 100 may include a wide variety of I/O devices 135, one or more of which is connected to the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media.

The computing device 100 may be any workstation, desktop computer, laptop or notebook computer, server machine, virtual device, mobile telephone, smart phone, portable telecommunication device, media playing device, gaming system, mobile computing device, or any other type of computing, telecommunications or media device, without limitation, capable of performing the operations described herein. The computing device 100 may be one of a plurality of devices connected by a network or connect to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be a private or public switched telephone network (PSTN), wireless carrier network, local area network (LAN), private wide area network (WAN), public WAN such as the Internet, etc., with connections being established using appropriate communication protocols. Thus, it should be understood that, unless otherwise limited, the computing device 100 may communicate with other computing devices 100 via any type of network using any conventional communication protocol.

Turning now to other aspects of the present invention—and with general reference now to FIG. 2—speech or language processing will be discussed along with a keyword spotting and/or targeted transcription engine according to embodiments of the present invention. By way of background, speech processing, which includes automatic speech recognition (ASR) and natural language understanding (NLU), is a field that includes aspects of computer science, artificial intelligence, and linguistics. ASR is concerned with transforming audio data associated with speech into a textual representative of that speech, while NLU is concerned with enabling computers to derive meaning from a textual input containing natural language. ASR and NLU are often used together as part of speech processing or a speech processing system. In such cases, a voice or speech input provided by a user is transformed into text, and then meaning is derived from the natural language of that text.

It will be appreciated that such speech processing can be computationally expensive, and performance of speech processing systems can be evaluated based on the computational resources required. Other criteria include accuracy, reliability, language support, and the speed with which speech can be recognized. In regard to accuracy, several factors can affect the performance of an ASR systems, such as, for example, accent, articulation, speech rate, pronunciation, and background noise. Nevertheless, speech processing systems are expected to perform consistently and reliably irrespective of channel conditions and various artifacts introduced by modern telephony channels.

Customer service call or contact centers (or simply "contact centers") provide an exemplary commercial setting where providing reliable speech processing—particularly when real-time processing is required—often proves challenging. In providing customer service for large businesses, contact centers are required to handle large volumes of customer calls as a regular course of business. For several reasons, it is generally desirable for contact centers to transcribe these calls. For example, contact centers can use such transcriptions and the data derived therefrom to develop analytics aimed at improving in-call customer service and contact center operations. However, to do this requires immense processing speed and capacity, particularly, if the transcriptions are need in real-time. Thus, while having full-text transcriptions of customer calls can be advantageous, the considerable expense and computational resources required makes it difficult or impossible for contact centers to justify.

Furthermore, even when full-text transcription is attempted, the nature of the language models used in available ASR transcription systems results in errors that negate many of the possible advantages. Specifically, conventional ASR transcription systems often make contextual errors that cause not just individual words being wrongly recognized but lead to whole sentences or paragraphs being wrongly interpreted. For example, if errors occur in sentences containing words or phrases that are important to determining the semantic context of a particular conversation, such errors generally propagate through the remainder of the transcription. In turn, contextual errors of this type undermine the performance of certain analytics, which depend upon accurate transcriptions to produce useful insights.

Such contextual errors present particular problems for contact centers because the customer service agents regularly have conversations with customers that are specific to a particular domain or lexicon (i.e., unique to a specific product or field). In such cases, the accurate transcription of the conversation depends on familiarity with the specialized lexicon associated with a given domain. The use of generic language models for transcription typically yields poor results because such language models fail to adequately recognize domain-specific words, unique word usages, and/or atypical word ordering. Of course, this situation can be rectified by developing a language model that is specific to the given domain. However, such models are costly to create, as considerable subject matter expertise and a large amount of training data are required.

In accordance with the present invention, a key phrase or keyword spotting approach is proposed that enables selective or targeted transcription. As will be seen, when used in accordance with functionality described herein, a system developed to perform this type of transcription—which may be referred to as a "targeted transcription engine"—may achieve many of the advantages associated with full-text transcription while requiring substantially less computational resources. For example, in relation to a contact center, the targeted transcription engine of the present invention would not need to initially generate a full-text transcription of each customer conversation. Instead, the targeted transcription engine would provide insights regarding the extent to which certain subject matter is discussed based on the detection of predetermined key phrases or words (which, as stated and in accordance with the definition provided in the paragraph below, will be referred to simply as "keywords") within a conversation and/or relative locations within the conversation where the keywords appeared. These insights then could be used to determine a desirability for transcribing the conversation. In such cases, the insights can further be used to determine whether a full transcription of the conversation is needed or whether, due to where the keywords appeared within the conversation, a partial transcription is sufficient.

As used within this context and unless otherwise explicitly limited, the term "keywords" refers to a predetermined set of words, which may include one or more single words, one or more phrases, or one or more word groupings (i.e., words that are appear or are grouped in accordance with a defined relationship to one another, such as, for example, a certain proximity to one another, or word count proximity, and/or in a particular order), where the detection of the words within the predetermined set of words—or, in some cases, the detection of semantically equivalent words—within a conversation or other audio stream is deemed significant toward determining whether a transcription of the conversation is desirable. For the sake of brevity, the term "keyword" or "keywords" is used herein to refer to such words, phrases, or word groupings throughout this description and the appended claim set.

Once it is decided that a transcription is desirable for a particular call or conversation, aspects of the targeted transcription system may be further utilized within the transcription process to improve transcription accuracy and timeliness. That is, systems and methods are proposed by which the keywords used in the search are utilized to provide a contextual guide to subsequent transcription. For example, when transcribing a conversation, the recognition of the other spoken words within the conversation—i.e., those words that were not identified during the keyword search—can be guided pursuant to the context established by the keywords. Thus, as will be seen, when disambiguating the paths through the word lattice during the transcription process, the speech recognition module and/or language model of the present invention uses the keywords as weighted anchor points to aid alignment and disambiguation. To the extent necessary, recognition can then be iteratively refined based on the improving contextualization of the conversation, as described more below.

In addition, because the present targeted transcription engine is able to recognize words or phrases supplied to it as either lexical text or phonetically, the need to create a domain-specific language model can largely be avoided. Instead, the necessary keywords can be automatically derived for the targeted transcription engine from data that is readily available from a contact center's other communication channels, such as, for example, material from chat, email, or social media that is known to exemplify a particular domain-specific lexicon. Thus, as will be seen, present systems and methods can reduce or even obviate the need to develop domain-specific language models for accurate transcription.

Figure 2:
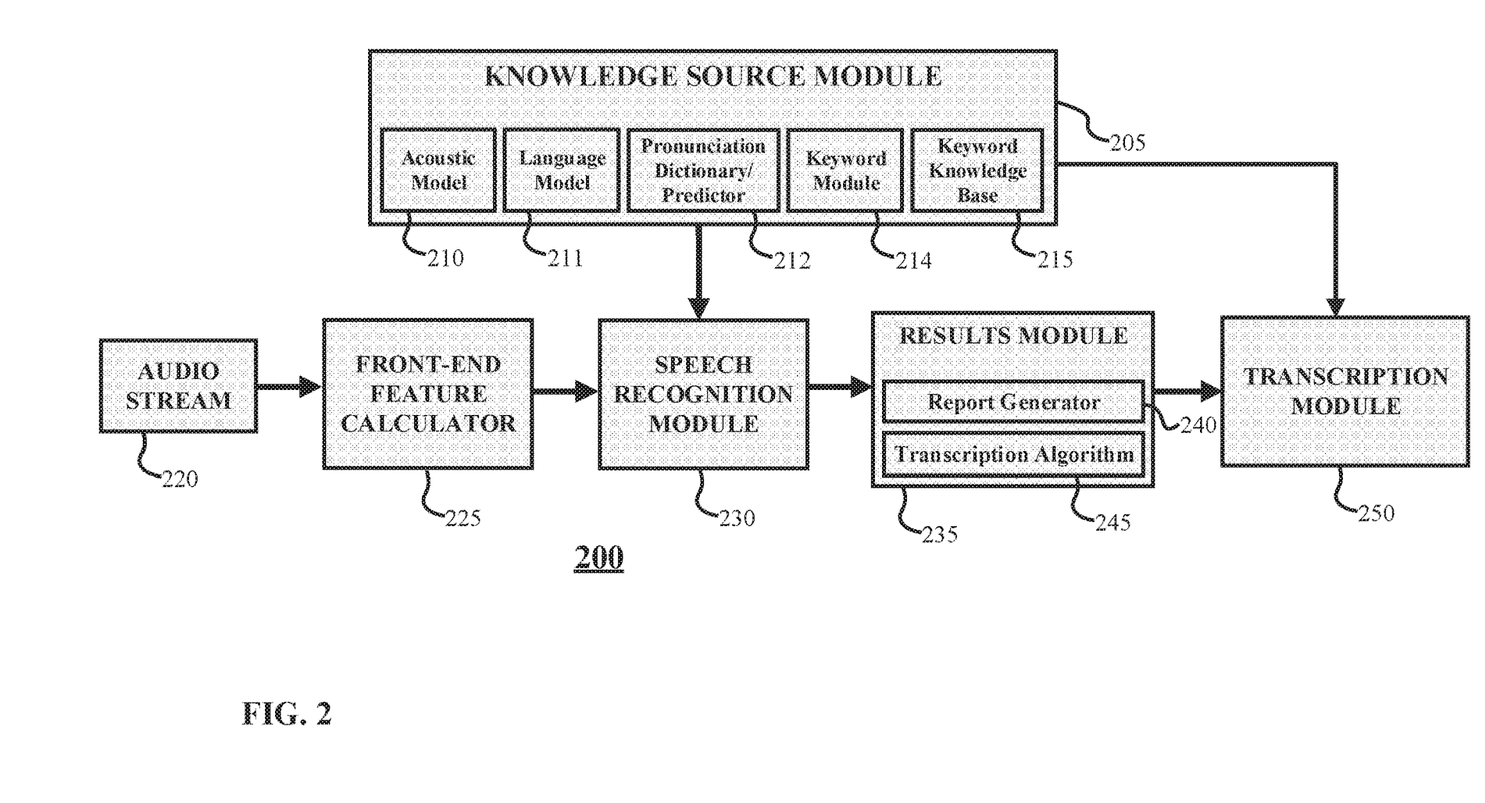
FIG. 2 is a diagram illustrating an exemplary embodiment of a targeted transcription engine in accordance with embodiments of the present invention.

With specific references to FIG. 2, a diagram is presented illustrating the basic components of a targeted transcription engine 200 according to embodiments of the present invention. The basic components of the targeted transcription engine 200 may include: a knowledge source module 205, which includes an acoustic model 210, a language model 211, a pronunciation dictionary/predictor 212, a keyword module 213, and a keyword knowledge base 215; an audio stream 220; a front-end feature calculator (or simply "feature calculator") 225; a speech recognition module 230; a results module 235, which includes a report generator 240 and transcription algorithm 245; and a transcription module 250. As will be seen, the targeted transcription engine 200 may be employed in conjunction with speech processing systems to reduce the need to fully transcribe an input audio stream (or "speech input"). Instead, such calls, or portions thereof, may be economically targeted for transcription based on the detection of keywords. Aspects of speech recognition will now be discussed in relation to exemplary utilizations of this technology in embodiments of the present invention. It should be understood, however, that the following discussion is not intended as limiting and, unless otherwise specifically limited in the appended claims, any conventional speech recognition systems or techniques may also be used without deviating from the scope of the present invention.

In exemplary embodiments, the knowledge source module 205 may include an acoustic model 210, a language model 211, and a pronunciation dictionary/predictor 212, aspects of which may be provided to and used by the speech recognition module 230 to search for and detect instances when keywords are spoken within speech input of the audio stream 225. As discussed more below, the same components of the knowledge source module 205 may then be used to transcribe the speech input when the results of the keyword search demonstrate sufficient desirability. It will be appreciated that, in order to also provide multi-lingual support, multiple knowledge source modules may be provided.

In exemplary embodiments, the acoustic model 210 comprises a model configured to infer text sequences from the sequences of acoustic events or features measured within an audio or speech input. For example, the acoustic model 210 may be a probabilistic model—for example, hidden Markov model-Gaussian mixture model (or "HMM-GMM")—that describes statistical relationships between pronunciations of words and the sequences of acoustic features in a corresponding speech input. Such acoustic features are generally calculated from a speech input by sampling or dividing the speech input into frames of between 10 to 25 milliseconds in length. Acoustic features for each of the frames are then expressed in relation to measured values for a range of acoustic parameters. These acoustic parameters, which may be referenced generally as a "feature vector", provides a representation of the audio of the speech input occurring within a given frame. As will be appreciated, a sequence of such acoustic features, which also may be referred to also as a sequence of feature vectors or feature vector sequence, can be used to represent the audio occurring over a longer duration, which may be referred to as a segment of speech or speech segment, such as those associated with spoken words or the component thereof.

By way of background, a "phoneme" is understood as the basic unit of sound within a language for distinguishing meaning between different words. A predefined set of such phonemes is assumed to completely describe all meaningful sounds within a given language. As will be appreciated, an HMM encodes the relationship between the observed audio signal, e.g., the sequence of acoustic features, and the unobserved phonemes. To build an acoustic model, a training process is used to study the statistical properties of the acoustic feature or feature vectors emitted by an HMM state corresponding to a given phoneme. An emission probability density for the feature vector in a given HMM state of a phoneme may be learned through such training processes, which generally involves a large collection of transcribed training-data. Such training is often performed in relation to triphones, which refers to a tuple of three phonemes in the phonetic transcription sequence. The HMM states of triphones that are found to have a common emission probability density function may be tied together, i.e., mapped to tied-states, in order to determines the unique HMM states within a language for which the acoustic training is performed. Typically, the emission probability density function is modeled using a Gaussian mixture model (GMM), with the resulting set of the GMMs and HMMs being referred to as a type of acoustic model. Other types of acoustic models may be used to implement the acoustic model 210 of the present invention. That is, the acoustic model 210 of the present invention may be developed by modeling relationships between words and the sequences of acoustic features in speech associated with respective pronunciations. Thus, unless otherwise limited, it should be appreciated that the acoustic model 210 may include probabilistic or statistical models and/or models developed via machine learning or deep learning algorithms, in which multi-layered artificial neural networks learn/extract/translate features from datasets.

The language model 211 of the present invention may be a statistical model that can be used to restrict the word search when matching text to the speech input. For example, the language model 211 may be configured to define words that likely follow previously recognized words based on word order probabilities. Such word order probabilities can be derived from a training process. For example, the training process may include studying the statistical properties of word order given a large amount of training materials, such as the transcribed texts of prior customer conversations. The language model 211 may function to significantly restrict the word matching process by stripping away words choices that are improbable. In this way, the search space for finding matching words can be greatly reduced. As an example, the language model 211 of the present invention may include any conventional language model, such as, for example an n-gram language model, which contains statistics of word sequences, or a finite state language models, which define speech sequences by finite state automation. In example embodiments, the language model 211 may be used primarily during the transcription process, with use during the keyword spotting being limited or altogether excluded.

The pronunciation dictionary/predictor 212 may be configured to provide acoustic features associated with the pronunciations of keywords that may be used in the keyword searches. Such acoustic features will be referred to herein as an acoustic signature of a keyword (or simply "keyword acoustic signature") and, as will be appreciated, may be used to detect likely instances when a given keyword is spoken within the speech input, e.g., audio stream 220. A keyword acoustic signature, thus, refers to one or more sequences of audio features or feature vectors (or simply "feature vector sequences") that are used to predict keywords being spoken within the speech input by determining when sufficiently similar sequences of audio features or feature vectors are found within segments of the speech input. As will be appreciated, the keyword acoustic signature may include data covering several different pronunciations of a keyword.

An acoustic signature for a given keyword may already be determined and stored within a dictionary portion of the pronunciation dictionary/predictor 212. In such cases, the particular keyword acoustic signature is simply retrieved from storage when required to perform a keyword search. Alternatively, when a keyword is presented by a user for which a keyword acoustic signature is not already known, the pronunciation dictionary/predictor 212 may generate one. In such cases, for example, the user may present the keyword in human readable form, such as grapheme/alphabets of a particular language. The pronunciation dictionary/predictor 212 then may predict pronunciations for the keyword and generate the keyword acoustic signature based on those pronunciations. The pronunciation dictionary/predictor 212 may also determine probabilities associated with the possible pronunciations. In generating the acoustic signature, for example, the pronunciation dictionary/predictor 212 may decompose a given keyword into a sequence of phonemes that represent a predicted pronunciation. Toward this end, the pronunciation dictionary/predictor 212 may include a grapheme-to-phoneme conversion tool that is used to generate variations in pronunciation. Once the sequences of phonemes are obtained, the corresponding statistical model for each of the phonemes (or the corresponding triphones) in the acoustic model 210 can be used to construct a concatenation of the required statistical models, which then becomes part of the acoustic signature of the keyword. Furthermore, a tool may be provided that enables a user to define customized pronunciations, which can be especially helpful when dealing with certain dialects. No matter how the keyword acoustic signature is received or derived, it may be used to search the audio stream 220 for the corresponding keyword by comparing the keyword acoustic signature to the acoustic features of segments of the audio stream 220. As will be appreciated, such acoustic features may be extracted from those segments of the audio stream 220 by the front-end feature calculator 225.

The knowledge source module 205 may further include a keyword module 213 and a keyword knowledge base 215. The keyword module 213 may determine and store the keywords and then provide them to the other modules within the targeted transcription engine 200 as required by the functionality described herein. The keyword module 213 also may include functionality wherein domain-specific keywords are identified from a base of materials and other knowledge, which is referred to as a keyword knowledge base 215. For example, as described, the present targeted transcription engine 200 is able to recognize words or phrases supplied to it as either lexical text or phonetically. This functionality may be utilized to generate automatically domain-specific language models in a way that largely avoids the cost and resources required if done conventionally. As an example, necessary keywords can be automatically derived from a readily available knowledge base of data that can be conveniently identified and stored to create the keyword knowledge base 215. For example, the data stored within the keyword knowledge base 215 may be derived from data that is regularly stored as part of the operation of a contact center's other communication channels, such as, chat, email, and/or social media. Textual data may be selected from these sources pursuant to how closely it exemplifies a given domain-specific lexicon.

In one example, the process begins with a user supplying a limited number of key phrases or words or word groupings. The keyword module 213 then may expand upon that list with other words that are semantically equivalent to those. To make sure that the expansion matches the right sense for the semantically equivalent word (e.g., synonym) in the specific domain, the keyword knowledge base 215 may be used as to check as to whether the words appear in a statistical sense in the same context. In this way, present systems and methods can reduce or even obviate the need to develop domain-specific language models for accurate transcription. Once keywords are identified, the keyword module 213 may include maintaining a library of such keywords, which then may be selectively applied to incoming calls on the basis of customer type or conversation subject matter.

More generally, it should be appreciated that the several components of the knowledge source module 205—i.e., the acoustic model 210, the language model 2011, the pronunciation dictionary/predictor 212, the keyword module 213, and the keyword knowledge base 215—may operate separately or in tandem to support the various functionalities described herein, particularly in relation to supporting the keyword searching function provided by the speech recognition module 230. Toward this end, as indicated in FIG. 2, the components of the knowledge source module 205 may communicate with each other, share certain resources, and provide data and other input via communication with the speech recognition module 230.

The remaining components and modules of the present targeted transcription engine 200 will now be described in relation to an example of operation. Initially, as indicated, an audio stream 220 is received. The audio stream 220, for example, may be audio data representing the recorded audio or speech sounds of one or more persons. As an example, the audio stream 220 may be words spoken within the context of a conversation between a customer and agent of a contact center. The audio data of the audio stream 220, for example, may be pulse-code modulation audio data. Further, the audio stream 220 may be a "live stream", i.e., a stream of audio data provided in real-time that relates to an ongoing conversation. The audio stream 220 also may be stored in memory and retrieved therefrom for processing.

As indicated, the audio stream 220 may be fed into a front-end feature calculator 225. In general, the front-end feature calculator 225 processes the data within the audio stream 220 to produce an output stream of data, which will be referred to herein as a processed audio stream. In doing this, the front-end feature calculator 225 may extract or calculate any of a range of acoustic features or parameters from the data within the audio stream 220, with those acoustic features or parameters being selected to facilitate the search for keywords that is perform within the speech recognition module 230. In this way, the front-end feature calculator 225 converts or transforms aspects of the audio stream 220 into a useful representation thereof. For example, the front-end feature calculator 225 may perform audio analysis and processing that include the computation of spectral features such as Mel Frequency Cepstral Coefficients (MFCC) and/or its transforms. To do this, the audio stream 220 may be processed by sampling the speech signal and creating an image map of feature vectors representative of the acoustic features within each sampled frame. While such acoustic features of the processed audio stream may be referenced in accordance to the sampled frames, reference also may be made to the acoustic features found within segments of the audio stream (also "audio stream segments"), which represent the acoustic features exhibited within continuous portions of the input audio stream that are longer in duration than individual frames. Thus, the term "segment acoustic features" may be used herein to references the acoustic features exhibited within an audio stream segment. For example, segment acoustic features may refer to the acoustic features exhibited over a sufficient number of sequential sampled frames to correspond to a spoken phoneme or word.

The output of the front-end feature calculator 225 is then delivered to the speech recognition module 230. The speech recognition module 230 may include any available automatic speech recognition technology that can provide the functionality described herein. In accordance with exemplary embodiments, the speech recognition module 230 searches the processed audio stream for patterns indicating likely instances with keywords are spoken. For example, using probabilities derived by the acoustic model 210, the speech recognition model 230 may determine instances where there is sufficient confidence to infer that a keyword is spoken.

More specifically, within the front-end feature calculator 225, the audio stream 220 may be transformed into a sequence of acoustic features or feature vectors. Within this multi-dimensional acoustic space constructed by the front-end feature calculator 225, a spoken word becomes a sequence of MFCC vectors forming a trajectory in the acoustic space—often referred to as an "image map"—that describes the acoustic features within a given audio stream segment, which thus makes it analogous to the above-described term of "segment acoustic features". In this context, keyword spotting becomes a problem of computing the probability for when such image maps (i.e., segment acoustic features) within the audio stream 220 match a given acoustic signature of keyword. Thus, the image map generated during the processing of the audio stream can be searched by comparing the image maps of segments contained therein to the image maps that correspond to the acoustic signature of a keyword. This operation may be achieved, for example, by using the principle of dynamic programming—specifically the Viterbi algorithm—which aligns an image map derived from the acoustic signature of a given keyword with image maps of segments occurring within the audio stream 220. Once aligned, a comparison is made to calculate a "match score", which is a score indicating a degree of similarity between the two image maps. If the calculated match score satisfies a predetermined threshold so to indicate sufficient confidence of a match, the speech recognition module 230 infers that the keyword is spoken within the particular segment of the processed audio stream. In certain embodiments, such as embodiments where real-time search results are needed, the keyword searching is performed within the speech recognition module 230 without performing linguistic analysis, textual analysis, or semantic analysis. Instead, the incoming audio stream or data is analyzed to determine if specific acoustic features or characteristics therein match stored audio data or acoustic signatures corresponding to a keyword. As will be discussed now, the detections of keywords (or "keyword detections") may be recorded and further processed within the results module 235.

The results module 235 may record data related to keyword detections, which then may be used to enable other functionality within the targeted transcription engine 200. For example, keyword detections may be tracked, recorded, and reported in real-time or as otherwise provided herein. According to example embodiments, the report generator 240 of the results module 235 produces, stores, and communicates reports that provide data relating to and describing instances when keywords are detected in the audio stream 220. Such reports may may be referred to as "instance reports". Instance reports may be stored and, as will be seen, the report generator 240 may aggregate the data from many such instance reports into a larger report or dataset that delivers keyword spotting outcomes in relation to a particular audio stream or portion thereof. This type of larger report may be referred to herein as an audio stream report or, simply, a dataset. In certain embodiments, subject audio streams may be identified in relation to particular conversations. In such cases, the audio stream report may be referred to as a "conversation report".

Along with simply recording that a keyword was detected, the instance report generated by the report generator 240 may record several types of data related to that detection. That is, the data recorded in the instance report may include several parameters, examples of which will now be discussed. A first parameter recorded within the instance report, for example, may include a position or offset within the audio stream at which the keyword is detected. Such positioning information may be represented in several ways. For example, the relative position may be represented as a time of detection within the audio stream. In such cases, the time may be recorded in relation to an offset from a start time and/or an end time of the audio stream. As will be described in more detail below, such data may be used to identify keyword clusters—i.e., clusters of keyword detections—occurring within the audio stream. Additionally, in the case where an audio stream is divided and categorized into several parts, the instance report may include data indicating which of the particular parts the keyword was detected in. A second parameter included within the instance report, for example, may be a confidence value indicating a confidence that the detection of the keyword is correct. As will be appreciated, the confidence value may be a function of how the keyword is spoken. For example, certain words may be pronounced in different ways, like the word "tomato" may be spoken as "tuh-mah-tow" and "tuh-may-tow". The confidence value may be lower when such a word is spoken according to the less common pronunciation. As another example, the confidence value may be lower when the word is not well enunciated. The specific variant of the pronunciation that is part of a particular recognition may also be recorded in the instance report. Other results and parameters may be reported by the results module 235 pursuant to the functionality described herein.

In regard to the audio stream report, the report generator 240 may aggregate data from each of the instance reports occurring within the particular audio stream or conversation. In this way, the audio stream report may deliver keyword spotting analysis in relation to a particular audio stream. Thus, the audio stream report concerns the detection of keywords within a particular stream of audio data, for example, one recorded over a particular time frame, associated with a particular dialogue or conversation, and/or associated with one or more particular speakers. As the present invention may be used in relation to audio streams differentiated by conversations—such as, for example, conversations occurring between a contact center agent and a customer—the audio stream report may be referred to in the examples that follow as a "conversation report", though it should be realized that the usage of this term is intended as non-limiting. As will be appreciated, a conversation report, thus, may include data relating to individual keyword detections and the data recorded for each. The conversation report may include cumulative data reflecting the overall detections in a conversation. Such cumulative data, for example, may include the total number of keyword detections, the presence of keyword clusters within particular portions of the conversation, the confidence of each detection, the frequency that keywords were spoken, and other types of data in accordance with functionality described herein.

In regard to the types of keywords that can be used in conjunction with the present targeted transcription engine 200, these may include any word and selected according to different criteria and intended uses. Along these lines, the detection of the different types of keywords may be used to selectively transcribe conversations in different ways. Several exemplary categories of keywords are discussed below. It should be understood that the different categories of keywords may be used alone or in conjunction with each other.

A first type of keyword is referred to as a "subject matter identifier type". As used herein, the detection of this type of keyword may be used to identify particular subjects covered within a conversation. The identification of such subjects, for example, may be used to determine whether transcription is more or less desirable. Keywords that are subject matter identifiers may include domain-specific terms having a particular meaning given the specific domain.

A second type of keyword is referred to as a "conversation stage identifier type". As used herein, the detection of this type of keyword may be used to classify the different stages occurring within a conversation. For example, in the context of customer service, conversations between an agent and customer may generally proceed in accordance with identifiable stages, such as a greeting stage, a problem identification stage, a solution stage, and a concluding stage. As will be appreciated, the detection of the agent or customer using certain terms, which may be referred to as "conversation stage identifiers", can be used to identify such stages within a particular conversation. Once the stages of a conversation are classified in this way, such information can be used to help identify portions of the conversation that are generally considered of greater and lesser importance based on given criteria. In turn, this information can be used by the systems and methods of the present invention to target portions of an audio stream for transcription.

A third type of keyword is referred to as a "sensitive information identifier type". As used herein, the detection of this type of keyword may be used to identify portions of a conversation in which sensitive information is likely revealed, for example, personal information provided by a customer to receive certain services. In such cases, the detection of an agent or customer using certain keywords is found to increase the likelihood that sensitive information will be revealed in the corresponding portion of the conversation. For example, one such determination could include the increased likelihood that a customer reveals their social security number in a portion of a conversation where the keyword "social security number" is detected. In accordance with example embodiments, the detection of such a keyword may be used to prevent the transcription of a defined portion of the conversation, which may enable safeguards against disseminating personal information in violation of privacy laws.

The results module 234 may further include transcription algorithm 245. As used in relation to an audio stream associated with a given conversation, the transcription algorithm 245 defines the logic, rules and algorithms that are applied to the data of keyword detections within the conversation for determining a desirability of transcribing the conversation (or "transaction favorableness score"). The transcription algorithm 245 may base this determination on the detection of keywords, including the total number of keyword detections, frequency of keyword detections, the presence of clusters of keyword detection, confidence of the keyword detections, the detection of a certain keyword in proximity to (e.g., within predetermined range of) another keyword, and other criteria as required by the functionality described herein. Such factors also may be used to determine whether a conversation should be transcribed in whole or in part.

Once the transcription algorithm 245 is used to determine the portions of the audio stream that should be transcribed, operation may pass to the transcription module 250, which then performs the necessary transcription. In performing this function, the aspects of the system that enable the keyword search (or duplications of those systems) may be utilized within the transcription process to improve the accuracy of the transcription. For example, the same keywords that were searched may now be used to guide transcription. Thus, during transcription, the recognition of the other words within the conversation—i.e., those words that have not already been recognized as keywords—is guided in relation to the context established by the keywords. When disambiguating the paths through the word lattice during the transcription process, the speech recognition module of the present invention uses the keywords as weighted anchor points to aid alignment and disambiguation. To the extent necessary, recognition can then be iteratively refined based on the improving contextualization of the conversation. For example, before performing transcription, the audio stream 220 could be sent through the targeted transcription engine 200 on a "second pass" in which an expanded or more refined set of keywords is used. In this way, more contextual anchor points could be established, which further constrains word recognition and accuracy when the transcription is completed.

Figure 3:
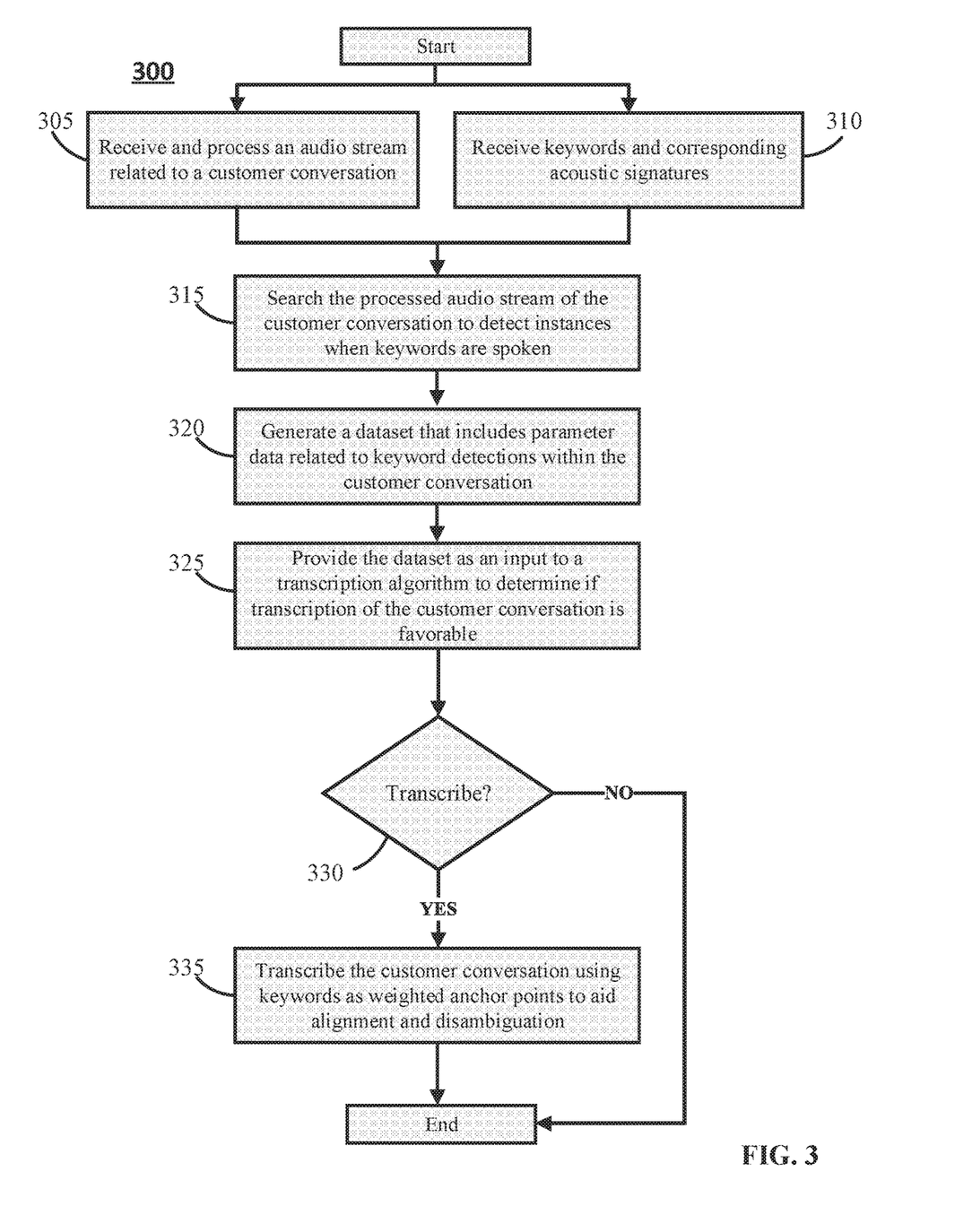
FIG. 3 is a flow diagram illustrating a method according to embodiments of the present invention.

With reference now to FIG. 3, an exemplary method 300 for implementing targeted transcription is shown that uses aspects of the previously discussed targeted transcription engine 200. The method 300 is presented in relation to conversation, which will be referred to as a "customer conversation" during this discussion. Further, aspects of the example may be presented as if the keyword searching is being done to determine whether to transcribe the entire customer conversation. It will be appreciated, however, that in accordance with other embodiments, the process may be applied in the same manner to portions of a single conversation or to audio streams that include multiple conversations.

As depicted, the method 300 begins with two operations that may occur concurrently or at different times. At operation 305, a stream of audio data (or simply "audio stream") of a customer conversation is received and processed. The audio stream may be obtained from a number of sources. For instance, the audio stream could be stored audio data files or multimedia files having an audio component. The audio stream could for instance be held in a database or could be obtained from sources such as the internet. Alternatively, the audio stream could be a live feed, for instance, a telephone conversation occurring between a customer and a customer support agent (or simply agent) at a contact center. Thus, in accordance with example embodiments, an audio file or stream (referred to herein generally as "audio stream") is received from a telephone call, a live stream of broadcast video or audio, from archived audio or video or from any other source of audio. As described above, the data of audio stream may be processed, for example, by sampling and processing the speech signal to create representation of the audio stream showing the presence of phonemes or words via acoustic features within captured audio frames or audio stream segments.

At operation 310, keywords and the corresponding acoustic signatures of the keywords are received. The keywords may be received from any of the above-described sources. In accordance with certain embodiments, keywords also may be generated or derived from the content stored within a knowledge base. In the context of a contact center, the knowledge base may include text from prior communications between agents and customers, such as, chat communications, email communications, and/or transcribed conversations. Additionally, such prior communications, for example, may be selected for inclusion within the knowledge based on applicability to a domain-specific lexicon, which may be associated a particular product or service. As described more above, an example derivation of a "first keyword" from such a knowledge base may include the following steps: receiving a second keywords, such as by user input or otherwise; based on a general language model, determining a candidate word that is semantically equivalent to the second keyword; determining whether the candidate word is used in a semantically equivalent manner as the second keyword within the domain-specific lexicon of the knowledge base; and upon determining semantically equivalent use, designating the candidate word as the first keyword.

Additionally, as described above, the acoustic signatures related to keywords retrieved from storage or generated. Towards this end, a pronunciation dictionary and/or pronunciation predictor may be utilized. For example, when the keyword is within the pronunciation dictionary, acoustic signature may be automatically retrieved. When the keyword is outside the dictionary, a pronunciation predictor, such as a grapheme-to-phoneme conversion tool, may be used to generate likely variations in pronunciation and, in relation thereto, acoustic signatures. A tool may also be provided that enables a user to define customized pronunciations. As shown, with the completion of steps 305 and 310, the method 300 continues with control being passed to operation 315.

At operation 315, the processed audio stream of the customer conversation is searched to detect instances when the keywords are spoken. According to exemplary embodiments, this may include any of the audio searching techniques discussed herein, such as automatic speech recognition or conventional equivalents or other known tools. For example, acoustic features within segments of the processed audio stream may be compared to the acoustic signature of a given keyword. This may be done by aligning a segment of the image map of the audio stream, as produced by a front-end feature calculator, to signature image maps of a given keyword to determine whether there are sufficient similarities to indicate a likely match. The degree of similarity may be used to indicate a confidence level of the match, wherein the confidence level required may be adjusted to be as over inclusive or under inclusive as desired. As illustrated, the method 300 then continues with control being passed to operation 320.

At operation 320, a dataset is generated that includes parameter data related to keyword detections within at least a portion of the customer conversation. Such a dataset may include a conversation report that includes parameter data of keyword detections occurring over the course of the customer conversation or other audio stream. More generally, the dataset may include cumulative data of keyword detections occurring within a defined portion of the customer conversation or other audio stream. Thus, in certain embodiments, one or more cumulative datasets may be compiled for one or more corresponding portions of the audio stream. In such case, it will be appreciated that each of the one or more cumulative datasets would include parameter data for the keyword detections occurring within a corresponding one of the portions of the audio stream.

Methods of the present invention may also include a related step in which an audio stream, e.g., customer conversation, is dividing into multiple portions—for example, a first audio stream portion and second audio stream portion—so that transcription analysis for each may be performed. In accordance with alterative embodiments, the locations for such divisions may be based on several factors. As an example, the division may be based on the location of a cluster of the keyword detections. The cluster of keyword detections, for example, may include keywords of the subject matter identifier type being found in the first audio stream portion and not within the second audio stream portion. In another example, the division may be based on the classification of the customer conversation into stages, as previously described. Such conversation stage classification may be based on the detection of keywords of the conversation stage identifier type. In another example, the division may be based on the detection of a keyword in a portion of the audio stream that is of the sensitive information identifier type. In such cases, for example, the limits of the corresponding audio stream portion may be demarked in relation to the position of that particular keyword. As illustrated, the method 300 then continues with control being passed to operation 325.

At operation 325, a transcription algorithm (or simply "algorithm") may applied to the data compiled in the previous step. In exemplary embodiments, a conversation report that includes cumulative data for keyword detection in a customer conversation may be provide as input data for the algorithm. Alternatively, a dataset of such information may be compiled for portions of the audio stream or customer conversation. As part of this step, a predetermined threshold may be defined against which a calculated transcription favorableness score is compared in order to determination whether transcription is warranted.

For example, the transcription favorableness score may be calculated for the customer conversation, the audio stream, and/or portions thereof. As will be appreciated, this may be accomplished using a variety of different scoring systems and algorithms. In general, the transcription favorableness score may be calculated via several defined criteria, with the objective of the scoring system being to indicate a likelihood that subject matter discussed within the customer call matches subject matter for which transcription is deemed desirable. Thus, for example, the transcription favorableness score may depend upon criteria such as total number of keyword detections, frequency of keyword detections, clusters of keyword detections, usage of a certain keyword in proximity to another certain keyword, usage of keywords by certain parties, etc. As another example, the scoring system may be a weighted one that places greater importance to the usage of some keywords over others. Such a system, for example, may place greater weight on the use of a particular keyword in different stages of the conversation. Such weights may be adjusted against results. In an alternative, the data related to the keyword detections may be passed along as each detection occurs so that the transcription algorithm is applied as the detection data accumulates, which, for example, may continue until the predetermined threshold is satisfied. As illustrated, the method 300 then continues with control being passed to operation 330.

At operation 330, as stated above, the method 300 proceeds by determining whether transcription is warranted. The transcription decision is made in accordance with the outcome of operation 325. Thus, as will be appreciated, operation 330 may be performed by comparing the relative values of the calculated transcription favorableness scores against a predetermined threshold. If the predetermined threshold is not satisfied by the transcription favorableness score, then "No", the method 300 will advance to the end and terminate without the transcription of the customer conversation.

However, if the predetermined threshold is satisfied by the calculated transcription favorableness score, then "Yes", the method 300 continues to operation 335 where the customer conversation is transcribed. As described above, aspects of the targeted transcription engine may be used to complete the transcription. For example, the supplied keywords may be used to guide and disambiguate the transcription of the other words within the conversation (i.e., those words not already having been recognized as keywords). Thus, when disambiguating the paths through the word lattice during the transcription process, a recognition engine can use the keywords previously supplied by the targeted transcription engine 200 as weighted anchor points to aid alignment and disambiguation. That is, recognition of the other words in the audio stream is done in accordance with a disambiguating context derived from the keyword detections.

The above-described systems and methods of the present invention offer several advantages over conventional approaches to speech transcription. As shown, keyword searching can be used to selectively targeted transcription so to realize advantages associated with full-text transcription while requiring substantially less computational resources. For example, within a contact center, the targeted transcription engine of the present invention does not initially generate a full-text transcription of each customer conversation, but instead provides insights regarding the extent to which certain predetermined keywords are spoken. The results then may be used to determine whether the conversation should be transcribed and, moreover, whether the transcription can be further limited to certain portions of the conversation. In addition, the detection of keywords can allow aspects of the present invention to avoid transcribing sensitive information, which can be utilized to provide safeguards protecting customer privacy.

Additionally, once it is decided that such transcription is warranted, systems and methods of the present invention that enable the keyword search may be further utilized within the transcription process to improve accuracy. Specifically, the same keywords are used to guide transcription by providing context. Thus, during transcription, the recognition of the other spoken words within the conversation can be guided pursuant to the context established by the already recognized keywords. When disambiguating the paths through the word lattice during the transcription process, for example, the speech recognition module of the present invention can use the disambiguating context provided by the keywords as weighted anchor points to aid alignment. As an alternative, to complete the transcription, the audio stream of a given conversation can be sent through the targeted transcription engine on a "second pass" using a more refined or expanded set of keywords, which may include additional keywords or, as used herein, "supplementary keywords". In this way, additional anchor points can be established, further constraining the full transcription and thereby improving accuracy. In such cases, the audio stream is searched to detect instances of spoken supplementary keywords (hereinafter "supplementary keyword detections"). Then, the audio stream may be transcribed in accordance with the disambiguating context derived from both the keyword detections and the supplementary keyword detections. To the extent necessary, this process can be repeated to iteratively refine the transcription.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A processor-implemented method for selectively transcribing voice communications, the method including the steps of:
    receiving keywords;
    receiving an audio stream, the audio stream comprising audio data of speech;
    analyzing the audio stream to detect instances of spoken keywords (hereinafter "keyword detections") and recording parameter data for each of the keyword detections, the parameter data comprising at least a location of the keyword detection within the audio stream;
    generating one or more cumulative datasets for one or more portions of the audio stream, each of the one or more cumulative datasets comprising the parameter data for the keyword detections occurring within a corresponding one of the one or more portions of the audio stream;
    for each of the one or more portions of the audio stream, calculating a transcription favorableness score via inputting the corresponding one of the one or more cumulative datasets into an algorithm; and
    determining whether to transcribe each of the one or more portions of the audio stream by comparing the corresponding transcription favorableness score against a predetermined threshold; transcribing the speech within a first audio stream portion of the audio stream; and wherein the transcribing the speech within a first audio stream portion of the audio stream comprises recognizing other words within the first audio stream portion according to a disambiguating context derived from both the keyword detections and a supplementary keyword detections.

2. The method according to claim 1, wherein the one or more portions of the audio stream comprises the first audio stream portion; and
    wherein the step of comparing the transcription favorableness score of the first audio stream portion against the predetermined threshold results in finding that the transcription favorableness score satisfies the predetermined threshold.

3. The method according to claim 2, wherein the step of transcribing the speech within the first audio stream portion comprises recognizing other words within the first audio stream portion according to a disambiguating context derived from the keyword detections.

4. The method according to claim 2, further comprising the steps of:
    receiving supplementary keywords; and
    analyzing the speech within the first audio stream portion to detect instances of spoken supplementary keywords (hereinafter "supplementary keyword detections").

5. The method according to claim 2, wherein, described in relation to an exemplary search for a first one of the keywords (hereinafter "first keyword"), the step of analyzing the audio stream for the keywords comprises:
    processing the audio data of the audio stream to calculate acoustic features;
    determining an acoustic signature of the first keyword (hereinafter "first keyword acoustic signature");
    comparing acoustic features of the first keyword acoustic signature with the acoustic features occurring within segments of the processed audio data to determine a degree of similarity therebetween; and detecting the first keyword as being spoken within one of the segments when the degree of similarity satisfies a predetermined threshold.

6. The method according to claim 5, wherein the first keyword acoustic signature covers at least a plurality of pronunciations;

further comprising the step of predicting at least one of the plurality of pronunciations by determining a sequence of phonemes for the at least one pronunciation using a grapheme-to-phoneme conversion tool.

7. The method according to claim 5, wherein the algorithm bases the transcription favorableness score, at least in part, on one or more of the following factors:

a frequency of the keyword detections;

a total number of the keyword detections; and a cluster of the keyword detections.

8. The method according to claim 7, wherein the parameter data for each of the keyword detections comprises a confidence score derived from the degree of similarity between the acoustic features of the first keyword acoustic signature with the acoustic features occurring within the segment of the processed audio data; and wherein the algorithm bases the transcription favorableness score, at least in part, on the confidence scores of the respective keyword detections.

9. The method according to claim 5, wherein the algorithm bases the transcription favorableness score, at least in part, on a one of the keyword detections associated with a first keyword being disposed within a predetermined range of another one of the keyword detections associated with a second keyword.

10. The method according to claim 2, wherein the audio stream comprises a customer conversation between a customer and an agent of a contact center, the contact center providing customer assistance services on behalf of an organization.

11. The method according to claim 10, wherein the customer conversation comprises an ongoing customer conversation;

wherein the step of analyzing the audio stream for the keywords comprises automatic speech recognition in which acoustic features in segments of the audio stream are compared against acoustic features of the keywords; and wherein the keywords include one or more single words, one or more phrases, and one or more word groupings, each of the one or more word groupings comprising at least two words that appear in accordance with a defined relationship involving either word count proximity or order.

12. The method according to claim 10, wherein the one or more portions of the audio stream comprise a first portion of the audio stream (hereinafter "first audio stream portion") and a second portion of the audio stream (hereinafter "second audio stream portion");

wherein:

the step of comparing the transcription favorableness score of the first audio stream portion against the predetermined threshold results in finding that the predetermined threshold is satisfied; and the step of comparing the transcription favorableness score of the second audio stream portion against the predetermined threshold results in finding that the predetermined threshold is not satisfied;

further comprising the step of:

transcribing the speech within the first audio stream portion; and preventing the second audio stream portion from being transcribed.

13. The method according to claim 12, wherein the keywords of the keyword detections comprise at least two of the following keyword types, in which:

a subject matter identifier type comprises keywords for identifying a subject matter discussed within a customer conversation;

a conversation stage identifier type comprises keywords for classifying stages of a customer conversation; and a sensitive information identifier type comprises keywords for identifying a presence of sensitive information in a customer conversation.

14. The method according to claim 13, further comprising the step of dividing the audio stream into the first audio stream portion and the second audio stream portion, wherein the division is based on a cluster of the keyword detections relating to the keywords of the subject matter identifier type occurring in the first audio stream portion instead of the second audio stream portion.

15. The method according to claim 13, further comprising the step of dividing the audio stream into the first audio stream portion and the second audio stream portion, wherein the division is based on the classification of the customer conversation into stages pursuant to a plurality of the keywords of the keyword detections being of the conversation stage identifier type.

16. The method according to claim 13, further comprising the step of dividing the audio stream into the first audio stream portion and the second audio stream portion, wherein the division is based on demarking limits of the second audio stream portion based on at least one of the keywords of the keyword detections occurring in the second audio stream portion being of the sensitive information identifier type.

17. The method according to claim 10, wherein at least a first one of the keywords (hereinafter "first keyword") is derived from content stored within a knowledge base, the content comprising text of prior communications between agents and customers of the contact center.

18. The method according to claim 17, wherein deriving the first keyword comprises the steps of:

selecting the prior communications for inclusion within the knowledge based on applicability to a domain-specific lexicon associated a particular product or service;

receiving the second one of the keywords (hereinafter "second keyword");

based on a general language model, determining a candidate word that is semantically equivalent to the second keyword;

determining whether the candidate word is used in a semantically equivalent manner as the second keyword within the domain-specific lexicon of the knowledge base; and upon determining semantically equivalent use, designating the candidate word as the first keyword.

19. The method according to claim 18, wherein the prior interactions comprise chat communications, email communications, and transcribed conversations.

20. A system for selectively transcribing voice communications, the system comprising:

a hardware processor;

a machine-readable storage medium on which is stored instructions that cause the hardware processor to execute a process, wherein the process comprises the steps of:
- receiving keywords;
- receiving an audio stream, the audio stream comprising audio data of speech;
- analyzing the audio stream to detect instances of spoken keywords (hereinafter "keyword detections") and recording parameter data for each of the keyword detections, the parameter data comprising at least a location of the keyword detection within the audio stream;
- generating one or more cumulative datasets for one or more portions of the audio stream, each of the one or more cumulative datasets comprising the parameter data for the keyword detections occurring within a corresponding one of the one or more portions of the audio stream;
- for each of the one or more portions of the audio stream, calculating a transcription favorableness score via inputting the corresponding one of the one or more cumulative datasets into an algorithm; and
- determining whether to transcribe each of the one or more portions of the audio stream by comparing the corresponding transcription favorableness score against a predetermined threshold; transcribing the speech within a first audio stream portion of the audio stream; and wherein the transcribing the speech within a first audio stream portion of the audio stream comprises recognizing other words within the first audio stream portion according to a disambiguating context derived from both the keyword detections and a supplementary keyword detections.

21. The system according to claim 20, wherein the process further comprises the steps of:
- receiving supplementary keywords; and
- analyzing the audio stream to detect instances of spoken supplementary keywords (hereinafter "supplementary keyword detections").

22. The system according to claim 20, wherein the one or more portions of the audio stream comprises the first audio stream portion; and
- wherein the step of comparing the transcription favorableness score of the first audio stream portion against the predetermined threshold results in finding that the transcription favorableness score satisfies the predetermined threshold.

23. The system according to claim 22, wherein, described in relation to an exemplary search for a first one of the keywords (hereinafter "first keyword"), the step of analyzing the audio stream for the keywords comprises:
- processing the audio data of the audio stream to calculate acoustic features;
- determining an acoustic signature of the first keyword (hereinafter "first keyword acoustic signature");
- comparing acoustic features of the first keyword acoustic signature with the acoustic features occurring within segments of the processed audio data to determine a degree of similarity therebetween; and
- detecting the first keyword as being spoken within one of the segments when the degree of similarity satisfies a predetermined threshold.

24. The system according to claim 23, wherein the algorithm bases the transcription favorableness score, at least in part, on one or more of the following factors:
- a frequency of the keyword detections;
- a total number of the keyword detections;
- a cluster of the keyword detections; and
- a confidence score derived from the degree of similarity between the acoustic features of the first keyword acoustic signature with the acoustic features occurring within the segment of the processed audio data.

* * * * *